3,385,656
METHOD OF PURIFYING ZINC AND CADMIUM CHALCOGENIDES
Manuel Aven, Burnt Hills, N.Y., assignor to General Electric Company, a corporation of New York
No Drawing. Filed Aug. 27, 1964, Ser. No. 392,581
9 Claims. (Cl. 23—50)

ABSTRACT OF THE DISCLOSURE

Semiconducting compounds of the Group IIb–Group VIa class are purified of small quantities of the order of 100 parts per million of metallic impurities by heating the semiconductor in a water slurry of an alkaline earth halide in a flow of inert gas. The alkaline earth halide diffuses into the semiconductor, reacts with the impurity, and the halide of the impurity is released and carried away by the gas flow.

---

The present invention relates to a method of purification and more particularly relates to the purification of phosphor compounds.

A wide variety of uses currently exist for compounds comprising elements selected respectively from Groups II and VI of the Periodic Table, including solar cell and other photovoltaic applications, electroluminescent devices, and various other light-productive and semiconductive devices. In all of these, it is of the utmost importance that the phosphor compounds used be as unaffected by impurities as possible, except for deliberately selected dopants, since even a very small quantity of impurity can make a significant difference in the operating characteristics of such devices and may decrease one of the device parameters, for example, efficiency or sensitivity, to a useless value. For example, iron is known to severely limit or prevent the occurrence of luminescence while aluminum is a donor which may cancel the desired electrical characteristics of an added acceptor. For many uses therefore, both of these elements must be removed or inactivated.

Many methods of removal have been used, involving relatively complex procedures. Even these, however, have not been effective to remove enough of the impurities so that the characteristics of the compound approach theoretical values.

Inherent in the previous methods was the assumption that any electrically active impurity added to the II–VI compounds would exert itself upon the parameters of the compound, at least to the extent of being a donor or an acceptor. Previous purification methods have accordingly been directed to the removal of all electrically active elements. It has not been recognized until now that the addition of certain of such elements would remove or inactivate undesired impurities while itself having substantially no effect on the operating characteristics or parameters of the resulting compound.

Accordingly, it is an object of the present invention to provide a novel method of purification of II–VI compounds.

A further object of the present invention is the provision of a novel method of removing or inactivating impurities which interfere with the electrical, luminescent and diffusion characteristics of II–VI compounds.

Another object of the present invention is the provision of a novel method of preparing II–VI compounds having improved electrical and luminescent characteristics.

Briefly, in accord with a preferred embodiment of this invention, the method of purifying II–VI compounds comprises mixing the material in powdered form with an alkaline earth halide and diffusing the halide into the material. Both the resulting compound and crystals grown therefrom by customary methods are found to have electrical and luminescent characteristics significantly closer to the theoretically predicted values for an absolutely pure crystal than those of any crystals obtainable by previous methods.

The novel features believed characteristic of this invention are set forth in the appended claims. The invention itself, together with further objects and advantages thereof, will best be understood by a consideration of the following specification.

In accord with one embodiment of the present invention, a powder of a compound comprising elements selected respectively from Group IIb and Group VIb of the Periodic Table is mixed with an aqueous solution of an alkaline earth halide comprising an element selected from the group consisting of magnesium, calcium, strontium, and barium and another element selected from the group consisting of chlorine, iodine and bromine, such as strontium chloride. The Table referred to is that of the W. Welch Manufacturing Co. The II–VI compound may, for example, be composed of zinc or cadmium as a cation and oxygen, sulfur, selenium or tellurium as an anion, or it may comprise mixtures, alloys or mixed crystal compounds thereof. The powder may be of commercially obtainable purity, for example, that obtainable from the General Electric Company under the designation "Electronic Grade." Such powder may contain objectionable impurities such as aluminum and iron as well as cadmium, copper, lead and titanium in concentrations varying from 1 to 50 parts per million. Although these concentrations appear to be quite small, they are known to be entirely unacceptable amounts for many of the photovoltaic, electroluminescent and other uses to which the material may be put.

The addition of the alkaline earth halide, in accord with the present invention, accomplishes the removal or deactivation of such impurities. The amount added should provide a sufficient excess of parts per million (p.p.m.) of the halogen over the total p.p.m. of the above mentioned impurities, and others which may be removed or deactivated, to assure every impurity a chance to react with a halogen ion. The precise amount of the excess is not critical; however, an excess of 10 times as many halogen atoms as impurity atoms is sufficient. As a practical matter, the addition of such a small amount of the halide is best accomplished by forming an aqueous solution thereof and then mixing the solution with the powdered compound to form a slurry. It has been found convenient to mix a sufficient quantity of 0.01 molar halide solution in water with the powdered compound so as to provide about 2000 parts of the halogen per million of the compound in the slurry. An alternative method may be used for adding sufficient halide so that there is an excess of parts per million of the halogen over the parts per million of impurities to be removed or inactivated.

In the case of addition by aqueous solution, the solution is dried, for example, by placing it in a porcelain dish and maintaining it in air at a temperature of about 110° C. for approximately 16 hours. This step is performed simply to remove the water from the slurry. The length of heating time in any given case depends on the amount of water present, the temperature and the amount of surface area of the composition which is exposed to hot air in the furnace.

At this point, any additional steps normally performed to prepare the powders for use may be done. For example, suitable dopants to give the powder N- or P-characteristics and which are not affected by the halogen may be added. Others, which might be removed or inactivated, may be added after completion of the purification. In the case of certain compounds such as zinc selenide which oxidize readily, the compound may now be heated and placed in a stream of hydrogen to remove the oxygen therefrom.

As the next step in the process of the present invention, the powdered mixture is heated in a furnace and a stream of argon is passed over it for a time sufficient to diffuse the halide throughout the powder and to remove any volatile halides which may form between the impurities in the powder and the halogen. The temperature should be high enough to remove any such volatile compounds which may be formed. The length of time is determined by the amount of powder in the furnace and the size of the powder particles. For example, one hour at 1000° C. has been found sufficient for 40 grams of powder screened through a No. 200 silk screen and placed in a tube 1.5" in diameter and 20" in length.

The powder as now prepared may be used in conventional manner in situations where phosphor powders are required or alternatively, suitable steps may be taken to prepare a crystal therefrom. For example, as disclosed in the copending application of W. W. Piper, Ser. No. 386,505, filed July 31, 1964, now Pat. No. 3,243,267, and assigned to the assignee of the present invention, the powder may be sintered to form a hard boule, and placed in a partially sealed chamber. A temperature profile may then be established such that the material of the boule vaporizes and condenses to seal off the tube and thereafter begins to condense at a point in the tube at which the optimum crystallization temperature exists. The reaction tube may then be moved so that the crystal surface remains at the optimum growth temperature, thereby accomplishing growth of a large single crystal. The steps of this process and the novel aspects thereof are set forth in detail in the aforementioned copending application.

The steps of the process set forth above have been found to result in substantially more pure II–VI compounds than were previously obtainable. While the mechanism by which this occurs is not completely understood, the improved results have been consistently repeated. Electron mobilities in N-type II–VI compounds have been tripled. For example, in the case of zinc selenide, crystals prepared in accord with this invention have exhibited mobilities as high as 5400 cm.$^2$/volt-sec. as compared with mobilities averaging 1700 cm.$^2$/volt-sec. for crystals from the same powder supply but without the added halogen. In the case of luminescent properties, crystals have been found to have increased band edge emission and decreased emission in other spectral regions which is attributed to impurities which create deeper energy levels. Its decrease therefore indicates the absence, or at least the inactivation, of such impurities by the halogen. For example, in the case of zinc selenide prepared in accord with this invention, a crystal exhibited photoluminescence at 77° K. characterized by a strong blue emission peaking at a wavelength of 4575 A. There was very little photoluminescent response at higher wavelengths, indicating freedom from impurities responsible for the well-known emission bands formerly seen at higher wavelengths in ZnSe. A $Cu_2Se$-ZnSe heterojunction diode fabricated from the same crystal boule showed injection electroluminescence emission also characterized by a strong blue emission line at approximately 4575 A. It has also been found that the diffusion of desired doping materials into the compound is not impaired by the method of the present invention.

The following theory is set forth as a probable explanation of these results and as an aid in understanding this invention. It is not intended, however, to limit the present invention to any proposed theory of operation.

It is currently believed that, although the halogens are donor impurities and might be expected to strongly affect at least the electrical properties of the compound, some of the halogen combines with the impurities to remove or inactivate them and the remaining halogen is bound in inactive complexes. In the case of certain of the impurities present, for example aluminum, it is believed that volatile halides are formed which are removed during the firing in argon. With certain other impurities, it is believed that the halogen becomes associated therewith in tightly bound neutral complexes which neither contribute to nor detract from the desired properties of the material. From the numerical range as stated previously, it can be seen that approximately 2000 parts per million of the halogen are added and a corresponding number of parts per million of the alkaline earth, while the total quantity of impurities present may only be in the neighborhood of 50–100 p.p.m. Since chemical analysis reveals the presence of relatively large amounts of the alkaline earth and the halogen in the final powder, it is possible that these are associated as a complex which remains inactive as such except where this complex is broken by the influence of the impurities. The alkaline earth associated with the halogen lost to the impurities is either volatilized and removed, bound with the halogen in the neutral complex or present in too small a quantity to have any substantial effect on the powder or crystal properties.

Regardless of the precise explanation which may actually be involved, the process of the present invention has been found to produce improved powders. The powder has properties corresponding closely to those of the theoretically pure material both in regard to electrical and luminescent properties and in regard to the diffusion of other elements therein.

The following specific examples are set forth by way of further explanation. These are not intended to limit the present invention, but rather to exemplify the practice and advantage thereof:

Example I.—A slurry of 40 grams of electronic grade zinc selenide with 27.6 cc. or 0.01 molar strontium chloride solution in water is prepared in a porcelain dish at ambient temperature in air. The slurry is dried in air for 16 hours at 110° C. The dried powder is screened through a No. 200 silk screen and placed in a quartz firing tube approximately 1.5 inches in diameter and 20 inches in length. The tube is placed in a furnace at a temperature of 800° C. and a stream of hydrogen at a rate of one cubic foot per hour is passed through the tube for one-half hour. The temperature is then raised to 1000° C. and a stream of argon is then passed through the tube at a rate of one cubic foot per hour for one hour.

A crystal is prepared from this powder in accord with the steps set forth in the aforementioned copending application of W. W. Piper. The powder is packed into a quartz tube, sealed off and sintered at 1000° C. for two hours in argon. The resultant sintered mass is sublimed in an argon atmosphere and the vapors condensed to grow a single crystal therefrom. The crystal so prepared exhibits improved mobility and luminescence characteristics.

Example II.—A slurry of 50 grams of electronic grade zinc selenide with 34.5 cc. of 0.01 molar barium bromide solution in water is prepared in a porcelain dish at ambient temperature in air. The slurry is dried for four hours at 130° C. to remove the water therefrom. The dried powder is then placed in a furnace at a temperature of 800° C. and a stream of hydrogen at a rate of one cubic foot per hour is passed through the tube for forty-five minutes. The temperature is then raised to 1000° C. and a stream of argon at a rate of one cubic foot per hour is passed through the tube for one and one half hours. The powder is screened through a No. 200 silk screen and the powder is used to prepare a crystal by the method described in Example I. The crystal so prepared exhibits improved mobility and luminescence characteristics.

Example III.—A slurry of 30 grams of electronic grade zinc telluride with 15.6 cc. of 0.01 molar barium iodide solution in water is prepared in a porcelain dish at ambient temperature in air. The slurry is dried in a vacuum desiccator for 16 hours at 50° C. The dried powder is screened through a No. 200 silk screen and placed in a quartz firing tube approximately 1.5 inches in diameter and 20 inches in length. The tube is placed in a furnace at a temperature of 1000° C. and a stream of argon is then passed through the tube at a rate of one cubic foot per hour for one hour. A crystal is prepared from this powder in accord with the method described in Example I. The crystal so prepared exhibits improved mobility and luminescence characteristics.

Example IV.—A slurry of 40 grams of electronic grade cadmium sulfide with 27.9 cc. of 0.01 molar calcium chloride solution in water is prepared in a porcelain dish at ambient temperature in air. The slurry is dried in air for 16 hours at 110° C. The dried powder is screened through a No. 200 silk screen and placed in a quartz firing tube approximately 1.5 inches in diameter and 20 inches in length. The tube is placed in a furnace at a temperature of 1000° C. and a stream of argon is passed through the tube at a rate of one cubic foot per hour for one hour. A crystal is prepared from this powder in accord with the steps set forth in Example I. The crystal so prepared exhibits improved mobility and luminescence characteristics.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A method of purifying compounds including an element selected from the group consisting of zinc and cadmium and another element selected from the group consisting of oxygen, sulfur, selenium, and tellurium which comprises the steps of placing a charge of the compound in a furnace and heating said charge in the presence of a water slurry of an alkaline earth halide in a quantity of 500 to 2000 parts per million of the compound to cause the diffusion of said alkaline earth halide into said charge; said heating being continued in a flow of argon gas for a time sufficient to allow substantially all impurities in said charge to react with said alkaline earth halide and be removed by said flowing argon.

2. The method claimed in claim 1 wherein said compound comprises zinc selenide.

3. The method claimed in claim 1 wherein said compound comprises cadmium sulfide.

4. The method claimed in claim 1 wherein said compound comprises zinc seleno-telluride.

5. The method of claim 1 wherein said alkaline earth halide is a compound of a metal selected from the group consisting of magnesium, calcium, strontium, barium, and a halogen selected from the group consisting of chlorine, bromine, and iodine.

6. The method of claim 5 wherein the alkaline earth halide is strontium chloride.

7. The method of claim 5 wherein the alkaline earth halide is barium bromide.

8. The method of claim 5 wherein the alkaline earth halided is barium iodide.

9. The method of claim 5 wherein the alkaline earth metal is calcium chloride.

References Cited

UNITED STATES PATENTS

| | | | |
|---|---|---|---|
| 2,482,006 | 9/1949 | Kertesz | 23—50 X |
| 2,818,391 | 12/1957 | Crosby | 23—50 X |

OSCAR R. VERTIZ, *Primary Examiner.*

HERBERT T. CARTER, *Examiner.*